US009723021B2

(12) United States Patent
Liu

(10) Patent No.: US 9,723,021 B2
(45) Date of Patent: Aug. 1, 2017

(54) VIRUS DETECTING METHOD AND DEVICE

(71) Applicant: Huawei Technologies Co., Ltd., Shenzhen (CN)

(72) Inventor: Zhenhua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 14/743,082

(22) Filed: Jun. 18, 2015

(65) Prior Publication Data

US 2015/0288707 A1    Oct. 8, 2015

Related U.S. Application Data

(63) Continuation of application No. PCT/CN2013/080979, filed on Aug. 7, 2013.

(30) Foreign Application Priority Data

Dec. 21, 2012 (CN) .......................... 2012 1 0560398

(51) Int. Cl.
*H04L 29/00* (2006.01)
*H04L 29/06* (2006.01)
(Continued)

(52) U.S. Cl.
CPC .......... *H04L 63/145* (2013.01); *G06F 21/562* (2013.01); *G06F 21/564* (2013.01);
(Continued)

(58) Field of Classification Search
CPC ... H04L 63/145; G06F 21/562; G06F 21/564; H04W 12/12
(Continued)

(56) References Cited

U.S. PATENT DOCUMENTS 7,418,729 B2    8/2008 Szor
7,925,888 B1 *  4/2011 Nachenberg .......... G06F 21/563
                                                  713/187

(Continued)

FOREIGN PATENT DOCUMENTS

CN    101458668 A    6/2009
CN    101526882 A    9/2009

(Continued)

OTHER PUBLICATIONS

Choi, Y., et al., "PE File Header Analysis-based Packed PE File Detection Technique (PHAD)," International Symposium on Computer Science and its Applications, Oct. 13, 2008, pp. 28-31.

(Continued)

*Primary Examiner* — Brandon Hoffman
*Assistant Examiner* — Michael D Anderson
(74) *Attorney, Agent, or Firm* — Conley Rose, P.C.

(57) ABSTRACT

A virus detecting method and device are provided, where the method includes that the virus detecting device receives a network data stream carrying a portable execute (PE) file; calculates first identification information according to structure information of the PE file; matches the first identification information with virus identification information prestored in an antivirus database, and determines whether the PE file is an Archive file; if the PE file is an Archive file, calculates second identification information according to a data packet that carries a data part of the Archive file; and matches the second identification information with the virus identification information prestored in the antivirus database, and if the matching succeeds, determines that the Archive file is an Archive virus file. The present invention can effectively determine whether an Archive-type PE file is a virus file.

19 Claims, 6 Drawing Sheets

(51) Int. Cl.
*H04W 88/02* (2009.01)
*G06F 21/56* (2013.01)
*H04W 12/12* (2009.01)

(52) U.S. Cl.
CPC .......... *G06F 21/567* (2013.01); *H04W 12/12* (2013.01); *H04W 88/02* (2013.01); *G06F 2221/033* (2013.01)

(58) Field of Classification Search
USPC .......................................................... 726/24
See application file for complete search history.

(56) References Cited

U.S. PATENT DOCUMENTS

| | | | |
|---|---|---|---|
| 7,996,904 | B1 | 8/2011 | Chiueh et al. |
| 2004/0015712 | A1 | 1/2004 | Szor |
| 2006/0015747 | A1 | 1/2006 | Van de Ven |
| 2007/0006300 | A1 | 1/2007 | Zamir et al. |
| 2007/0240222 | A1 | 10/2007 | Tuvell et al. |

FOREIGN PATENT DOCUMENTS

| | | | |
|---|---|---|---|
| CN | 102279917 A | | 12/2011 |
| CN | 102314571 A | | 1/2012 |
| CN | 102736978 A | | 10/2012 |
| CN | 103020524 A | * | 4/2013 |
| CN | 103067364 A | | 4/2013 |

OTHER PUBLICATIONS

Foreign Communication From a Counterpart Application, European Application No. 13864087.5, Extended European Search Report dated Nov. 16, 2015, 9 pages.
Partial English Translation and Abstract of Chinese Patent Application No. CN103067364, Part 1, Jun. 27, 2015, 7 pages.
Partial English Translation and Abstract of Chinese Patent Application No. CN103067364, Part 2, Jun. 27, 2015, 3 pages.
Partial English Translation and Abstract of Chinese Patent Application No. CN101458668, Sep. 23, 2015, 19 pages.
Foreign Communication From a Counterpart Application, Chinese Application No. 201280002903.2, Chinese Office Action dated Apr. 24, 2015, 6 pages.
Foreign Communication From a Counterpart Application, PCT Application No. PCT/CN2013/080979, English Translation of International Search Report dated Nov. 21, 2013, 2 pages.
Foreign Communication From a Counterpart Application, PCT Application No. PCT/CN2013/080979, English Translation of Written Opinion dated Nov. 21, 2013, 7 pages.

* cited by examiner

| Number Of Section | Time Date Stamp | Address Of Entry Point | Check Sum | Size Of Code | Size Of Image | Size Of Initialized Data | Characteristics |
|---|---|---|---|---|---|---|---|

VIRUS DETECTING METHOD AND DEVICE

CROSS-REFERENCE TO RELATED APPLICATIONS

This application is a continuation of International Application No. PCT/CN2013/080979, filed on Aug. 7, 2013, which claims priority to Chinese Patent Application No. 201210560398.5, filed on Dec. 21, 2012, both of which are hereby incorporated by reference in their entireties.

TECHNICAL FIELD

The present invention relates to the communications field, and in particular, to a virus detecting method and a virus detecting device.

BACKGROUND

When stream-based virus detection is performed on a portable execute (PE) file, only several data packets carrying a PE file header need to be reassembled, and matching a characteristic extracted from the PE file header with a characteristic that is of a known virus and that is prestored in an antivirus database is performed, where it is unnecessary to reassemble the entire file. Therefore, compared with a manner of characteristic-based virus detection for an entire file, performance of the stream-based virus detection thereof is higher.

Structure information in the PE file header describes various attribute information of the PE file in detail, such as information like a quantity of sections of the file, a data length of each section, a program start instruction address, and a platform required for running a program. A virus detecting method for performing detection on a PE file is extracting identification information from structure information of a PE file header, where the identification information may include combination of several pieces of information selected from the foregoing various attribute information, and comparing the identification information with a prestored virus characteristic, so as to detect whether the PE file carries a virus. Because PE file viruses account for more than 95% of all viruses, and if spreading of the PE file viruses can be effectively controlled on a network, security status of the network can be greatly improved.

An installation package file and a self-extracting file belong to PE files including additional data, and are also called Archive files. This kind of file includes two parts, where a first part is a complete PE file, and a second part is a data part. A large number of Archive files are merely different in a data part, and are completely the same in a PE file part. If the identification information is extracted from the structure information in the PE file header according to the existing method, and is used as a criterion to detect a virus file, all Archive-type files corresponding to the virus file are incorrectly detected as viruses.

At present, a common practice for solving the foregoing problem is skipping virus detection for an Archive file. However, a virus file can be easily processed into an Archive file, and if a virus spreader uses this characteristic to prepare a file including a virus into the Archive file, the existing stream-based virus detecting method for a PE file cannot determine whether an Archive file is a virus file carrying a virus.

SUMMARY

The present invention provides a detecting method and a related device that can effectively detect whether an Archive-type PE file is a virus file.

The virus detecting method and device that are in the present invention and used to solve the foregoing problem includes the following.

According to a first aspect, a virus detecting method is provided, including receiving a network data stream carrying a portable execute PE file, and obtaining a file header of the PE file by means of reassembly according to a data packet in the network data stream, where the file header includes structure information of the PE file; calculating first identification information according to the structure information of the PE file; matching the first identification information with virus identification information prestored in an antivirus database, and if the matching succeeds, determining, according to a correspondence that is between the virus identification information and a file type and is prestored in the antivirus database, whether the PE file is an Archive file, where the file type includes an Archive file and a PE virus file; if the PE file is an Archive file, acquiring, from the network data stream, a data packet that carries a data part of the Archive file, and calculating second identification information according to the data packet that carries the data part of the Archive file; and matching the second identification information with the virus identification information prestored in the antivirus database, and if the matching succeeds, determining that the Archive file is an Archive virus file.

In a first possible implementation manner of the first aspect, the method further includes if the PE file is a non-Archive file, determining that the PE file is a PE virus file.

With reference to the first aspect or the first possible implementation manner of the first aspect, in a second possible implementation manner of the first aspect, the acquiring, from the network data stream, a data packet that carries a data part of the Archive file, and calculating second identification information according to the data packet that carries the data part of the Archive file includes searching for, in a correspondence that is between the virus identification information and an Archive file form and is prestored in the antivirus database, an Archive file form corresponding to the first identification information, where the Archive file form includes an Archive file whose data part includes data structure information and an Archive file whose data part does not include data structure information; acquiring, from the network data stream, the data packet that carries the data part of the Archive file; and calculating the second identification information according to the Archive file form corresponding to the first identification information and according to the data packet that carries the data part of the Archive file.

With reference to the second possible implementation manner of the first aspect, in a third possible implementation manner of the first aspect, the calculating the second identification information according to the Archive file form corresponding to the first identification information and according to the data packet that carries the data part of the Archive file includes, if the Archive file form corresponding to the first identification information is the Archive file whose data part does not include data structure information, obtaining the data part of the Archive file by means of reassembly according to the data packet that carries the data part of the Archive file, and calculating a hash value of the data part of the Archive file by using a hash algorithm, and use the hash value as the second identification information; or if the Archive file form corresponding to the first identification information is the Archive file whose data part includes data structure information, obtaining, by means of reassembly according to the data packet that carries the data part of the Archive file, the data structure information included in the data part of the Archive file, and calculating, by using a hash algorithm, a hash value of the data structure information obtained by means of reassembly, and use the hash value as the second identification information.

With reference to the first aspect, the first possible implementation manner of the first aspect, or the third possible implementation manner of the first aspect, in a fourth possible implementation manner of the first aspect, the calculating first identification information according to the structure information of the PE file includes selecting at least two pieces of attribute information from the structure information of the PE file, and joining the at least two pieces of attribute information into a data block; and calculating a hash value of the data block by using the hash algorithm, and use the hash value as the first identification information.

According to a second aspect, a virus detecting device is provided, including an information acquiring module configured to receive a network data stream carrying a portable execute PE file, and obtain a file header of the PE file by means of reassembly according to a data packet in the network data stream, where the file header includes structure information of the PE file; a first calculating module configured to calculate first identification information according to the structure information that is of the PE file and that is acquired by the information acquiring module; a first determining module configured to match the first identification information calculated by the first calculating module with virus identification information prestored in an antivirus database, and if the matching succeeds, determine, according to a correspondence that is between the virus identification information and a file type and is prestored in the antivirus database, whether the PE file is an Archive file, where the file type includes an Archive file and a PE virus file; a second calculating module configured to, when the first determining module determines that the PE file is an Archive file, acquire, from the network data stream, a data packet that carries a data part of the Archive file, and calculate second identification information according to the data packet that carries the data part of the Archive file; and a second determining module configured to match the second identification information calculate by the second calculating module with the virus identification information prestored in the antivirus database, and if the matching succeeds, determine that the Archive file is an Archive virus file.

In a first possible implementation manner of the second aspect, the first determining module is further configured to determine that the PE file is a PE virus file if the PE file is a non-Archive file.

With reference to the second aspect and the first possible implementation manner of the second aspect, in a second possible implementation manner of the second aspect, the second calculating module includes a file form determining unit configured to search for, in a correspondence that is between the virus identification information and an Archive file form and is prestored in the antivirus database, an Archive file form corresponding to the first identification information, where the file form includes an Archive file whose data part includes data structure information and an Archive file whose data part does not include data structure information; a data packet acquiring unit configured to acquire, from the network data stream, the data packet that carries the data part of the Archive file; and a calculating unit configured to calculate the second identification information according to the Archive file form that is obtained by determining by the file form determining unit and that is corresponding to the first identification information and according to the data packet that carries the data part of the Archive file and that is acquired by the data packet acquiring unit.

With reference to the second possible implementation manner of the second aspect, in a third possible implementation manner of the second aspect, the calculating unit is configured to, when the Archive file form corresponding to the first identification information is the Archive file whose data part does not include data structure information, obtaining the data part of the Archive file by means of reassembly according to the data packet that carries the data part of the Archive file, and calculate a hash value of the data part of the Archive file by using a hash algorithm, and use the hash value as the second identification information; or when the Archive file form corresponding to the first identification information is the Archive file whose data part includes data structure information, obtaining, by means of reassembly according to the data packet that carries the Archive file part, the data structure information included in the data part of the Archive file, and calculate, by using a hash algorithm, a hash value of the data structure information obtained by means of reassembly, and use the hash value as the second identification information.

With reference to the second aspect, the first possible implementation manner of the second aspect, or the third possible implementation manner of the second aspect, in a fourth possible implementation manner of the second aspect, the first calculating module includes a joining unit configured to select at least two pieces of attribute information from the structure information that is of the PE file and that is acquired by the information acquiring module, and join the at least two pieces of attribute information into a data block; and a calculating unit configured to calculate, by using the hash algorithm, a hash value of the data block that is joined by the joining unit and use the hash value as the first identification information.

According to a third aspect, a virus detecting device is provided, including a receiver, a memory, and a processor, where the receiver is configured to receive a network data stream carrying a PE file; the memory is configured to store code; and the processor is configured to read the code stored in the memory and execute the following operations: obtaining a file header of the PE file by means of reassembly according to a data packet in the network data stream received by the receiver, where the data packet of the file header includes structure information of the PE file; calculating first identification information according to the structure information of the PE file; matching the first identification information with virus identification information prestored in an antivirus database, and when the matching succeeds, determining, according to a correspondence that is between the virus identification information and a file type and is prestored in the antivirus database, whether the PE file is an Archive file, where the file type includes an Archive file and a PE virus file; if the PE file is an Archive file, acquiring, from the network data stream, a data packet that carries a data part of the Archive file, and calculating second identification information according to the data packet that carries the data part of the Archive file; and matching the second identification information with the virus identification information prestored in the antivirus database, and when the matching succeeds, determining that the Archive file is an Archive virus file.

In a first possible implementation manner of the third aspect, a specific manner of executing, by the processor, the acquiring, from the network data stream, a data packet that carries a data part of the Archive file, and calculating second identification information according to the data packet that carries the data part of the Archive file is searching for, in a correspondence that is between the virus identification information and an Archive file form and is prestored in the antivirus database, an Archive file form corresponding to the first identification information, where the Archive file form includes an Archive file whose data part includes data structure information and an Archive file whose data part does not include data structure information; acquiring, from the network data stream, the data packet that carries the data part of the Archive file; and calculating the second identification information according to the Archive file form corresponding to the first identification information and according to the data packet that carries the data part of the Archive file.

With reference to the first possible implementation manner of the third aspect, in a second possible implementation manner of the third aspect, a specific implementation manner of executing, by the processor, the calculating the second identification information according to the Archive file form corresponding to the first identification information and according to the data packet that carries the data part of the Archive file is, if the Archive file form corresponding to the first identification information is the Archive file whose data part does not include data structure information, obtaining the data part of the Archive file by means of reassembly according to the data packet that carries the data part of the Archive file, and calculating a hash value of the data part of the Archive file by using a hash algorithm, and use the hash value as the second identification information; or if the Archive file form corresponding to the first identification information is the Archive file whose data part includes data structure information, obtaining, by means of reassembly according to the data packet that carries the data part of the Archive file, the data structure information included in the data part of the Archive file, and calculating, by using a hash algorithm, a hash value of the data structure information obtained by means of reassembly, and use the hash value as the second identification information.

With reference to the third aspect, the first possible implementation manner of the third aspect, or the second possible implementation manner of the third aspect, in a third possible implementation manner of the third aspect, a specific manner of executing, by the processor, the calculating first identification information according to the structure information of the PE file is selecting at least two pieces of attribute information from the structure information of the PE file, and joining the at least two pieces of attribute information into a data block; and calculating a hash value of the data block by using the hash algorithm, and use the hash value as the first identification information.

According to embodiments of the present invention, when whether an Archive file is a virus file is determined, identification information that is used to identify a virus characteristic is extracted from a data packet of a PE file header, and in addition, identification information is further extracted from a data part of the Archive file, and whether the Archive file is a virus file is determined according to the two pieces of identification information, thereby solving a problem in the prior art that whether an Archive file is a virus file carrying a virus cannot be determined, and effectively detecting whether an Archive-type PE file is a virus file.

BRIEF DESCRIPTION OF THE DRAWINGS

To describe the technical solutions in the embodiments of the present invention or in the prior art more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figures 1, 2:
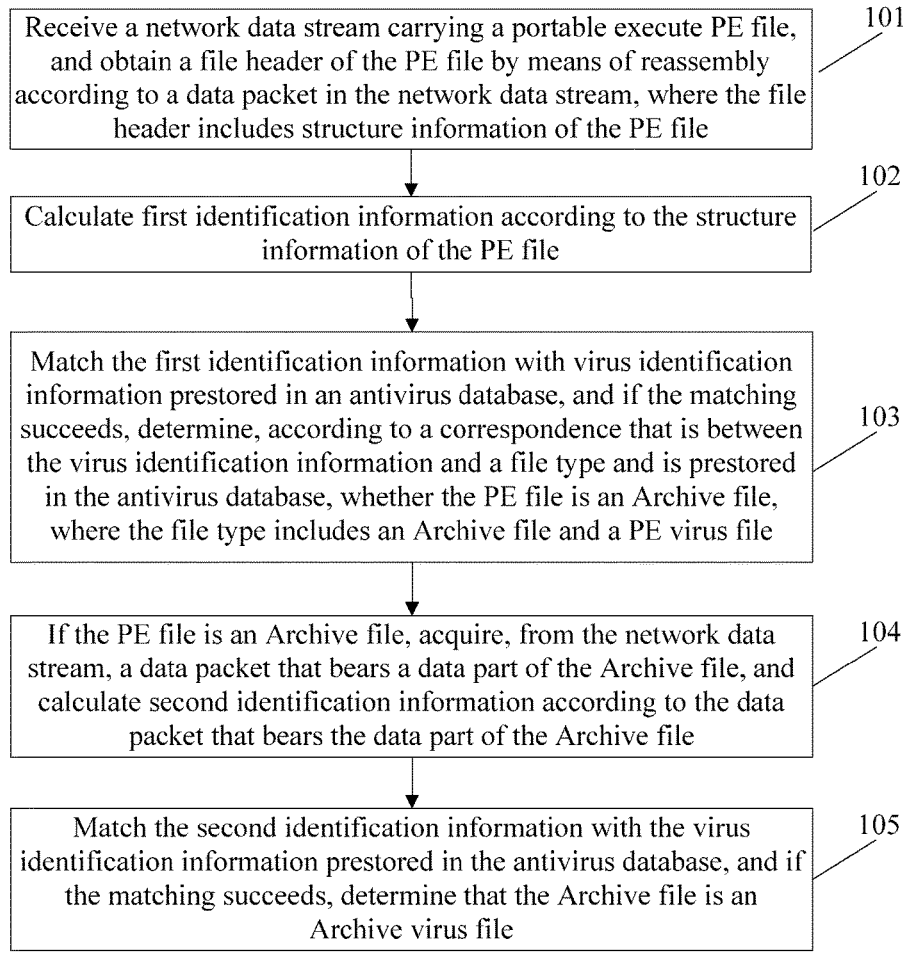
FIG. 1 is a flowchart of a virus detecting method according to an embodiment of the present invention.
FIG. 2 is a schematic diagram of a data block according to the embodiment in FIG. 1.

Referring to FIG. 1, FIG. 1 is a flowchart of a virus detecting method according to an embodiment of the present invention, where the process may be executed by a gateway device, or a device such as a firewall device or a router device that may obtain a data stream from a switching node on a network, which is not limited herein. The method includes the following steps.

101: Receive a network data stream carrying a PE file, and obtain a file header of the PE file by means of reassembly according to a data packet in the network data stream, where the file header includes structure information of the PE file.

The execution body may obtain the file header of the PE file by means of reassembly according to the data packet that is in the network data stream and includes the PE file header.

102: Calculate first identification information according to the structure information of the PE file.

An implementation manner of calculating the first identification information according to the structure information of the PE file may be selecting at least two pieces of attribute information from various attribute information described by the structure information of the PE file, and joining the at least two pieces of attribute information into a data block; and calculating a hash value of the foregoing data block by using a hash algorithm, and use the hash value as the first identification information.

The hash algorithm (which is also called a digest algorithm) is used to calculate data as another fixed length value, so as to ensure consistency and completeness of data transmission, and the hash algorithm may be used to identify a virus in the embodiment. A message digest 5 (MD5) algorithm is one of widely used hash algorithms, and a probability that MD5 values obtained by calculating different data are the same is very low, and is infinitely close to zero.

In the embodiment, the MD5 algorithm is preferably selected to calculate the first identification information, second identification information, and characteristic information (virus identification information) of a known virus in an antivirus database.

Optionally, in the embodiment, the following attribute information in the structure information of the PE file is selected.

1. Number of sections in the PE file (Number Of Section)
2. Generating time of the PE file (Time Date Stamp)
3. Address of a program entry point of the PE file (Address Of Entry Point)
4. Data check sum of the PE file (Check Sum)
5. Size of code segment of the PE file (Size Of Code)
6. Size of memory image of the PE file (Size Of Image)
7. Size of initialized data in the PE file (Size Of Initialized Data)
8. Section attribute of each section of the PE file (Characteristics)

The foregoing pieces of structure information are joined, according to the foregoing sequence, into a data block shown in FIG. 2, and an MD5 value of the data block is calculated.

103: Match the first identification information with virus identification information prestored in an antivirus database, and if the matching succeeds, determine, according to a correspondence that is between the virus identification information and a file type and is prestored in the antivirus database, whether the PE file is an Archive file, where the file type includes an Archive file and a PE virus file.

The antivirus database is a data file, and the antivirus database stores a characteristic of a currently known virus and a characteristic of an Archive file, which are collectively called virus identification information herein. The characteristic of the known virus herein is obtained by calculating part information extracted from a virus file, where a calculating method is the same as that in step 102. Characteristics of headers of archive files of a same type are the same, a characteristic of each header is corresponding to, whether a file based on which the characteristic is calculated is an archive file and what type of archive file the file is, and all these pieces of information are stored in the antivirus database. When matching an MD5 value that is used as the first identification information with the antivirus database is performed, whether the PE file corresponding to the MD5 value that undergoes the matching is a virus file, an archive file, or a non-virus file may be determined according to a matching result.

104: If the PE file is an Archive file, acquire, from the network data stream, a data packet that carries a data part of the Archive file, and calculate second identification information according to the data packet that carries the data part of the Archive file.

Optionally, an implementation manner of calculating the second identification information according to the data packet that carries the data part of the Archive file may be searching for, in a correspondence that is between the virus identification information and an Archive file form and is prestored in the antivirus database, an Archive file form corresponding to the first identification information, where the Archive file form includes an Archive file whose data part includes data structure information and an Archive file whose data part does not include data structure information; acquiring, from the network data stream, the data packet that carries the data part of the Archive file; and calculating the second identification information according to the Archive file form corresponding to the first identification information and according to the data packet that carries the data part of the Archive file.

The data structure information in the Archive file whose data part includes data structure information includes a cyclic redundancy check (CRC) value of the data part, a size of the data part, and the like. The CRC check value is a numerical value obtained by calculating a segment of data by using an algorithm, and for the Archive file, the CRC check value is a numerical value obtained by calculating data of the data part.

Optionally, an implementation manner of the calculating the second identification information according to the Archive file form corresponding to the first identification information and according to the data packet that carries the data part of the Archive file may be, if the Archive file form corresponding to the first identification information is the Archive file whose data part does not include data structure information, obtaining the data part of the Archive file by means of reassembly according to the data packet that carries the data part of the Archive file, and calculating a hash value of the data part of the Archive file by using a hash algorithm, and use the hash value as the second identification information; or if the Archive file form corresponding to the first identification information is the Archive file whose data part includes data structure information, obtaining, by means of reassembly according to the data packet that carries the data part of the Archive file, the data structure information included in the data part of the Archive file, and calculating, by using a hash algorithm, a hash value of the data structure information obtained by means of reassembly, and use the hash value as the second identification information.

In the embodiment, the MD5 algorithm is preferably used to calculate the second identification information.

105: Match the second identification information with the virus identification information prestored in the antivirus database, and if the matching succeeds, determine that the Archive file is an Archive virus file.

In the embodiment, when a virus file is determined, identification information that is used to identify a virus characteristic is extracted from a data packet of a PE file header, and in addition, identification information is further extracted from a data part of an Archive file, and whether the Archive file is a virus file is determined according to the two pieces of identification information, thereby solving a problem in the prior art that whether an Archive file is a virus file carrying a virus cannot be determined. The present invention can effectively detect whether an Archive-type PE file is a virus file, improve reliability of a stream-based virus detecting method, and further improve security status of a network.

Figure 3:
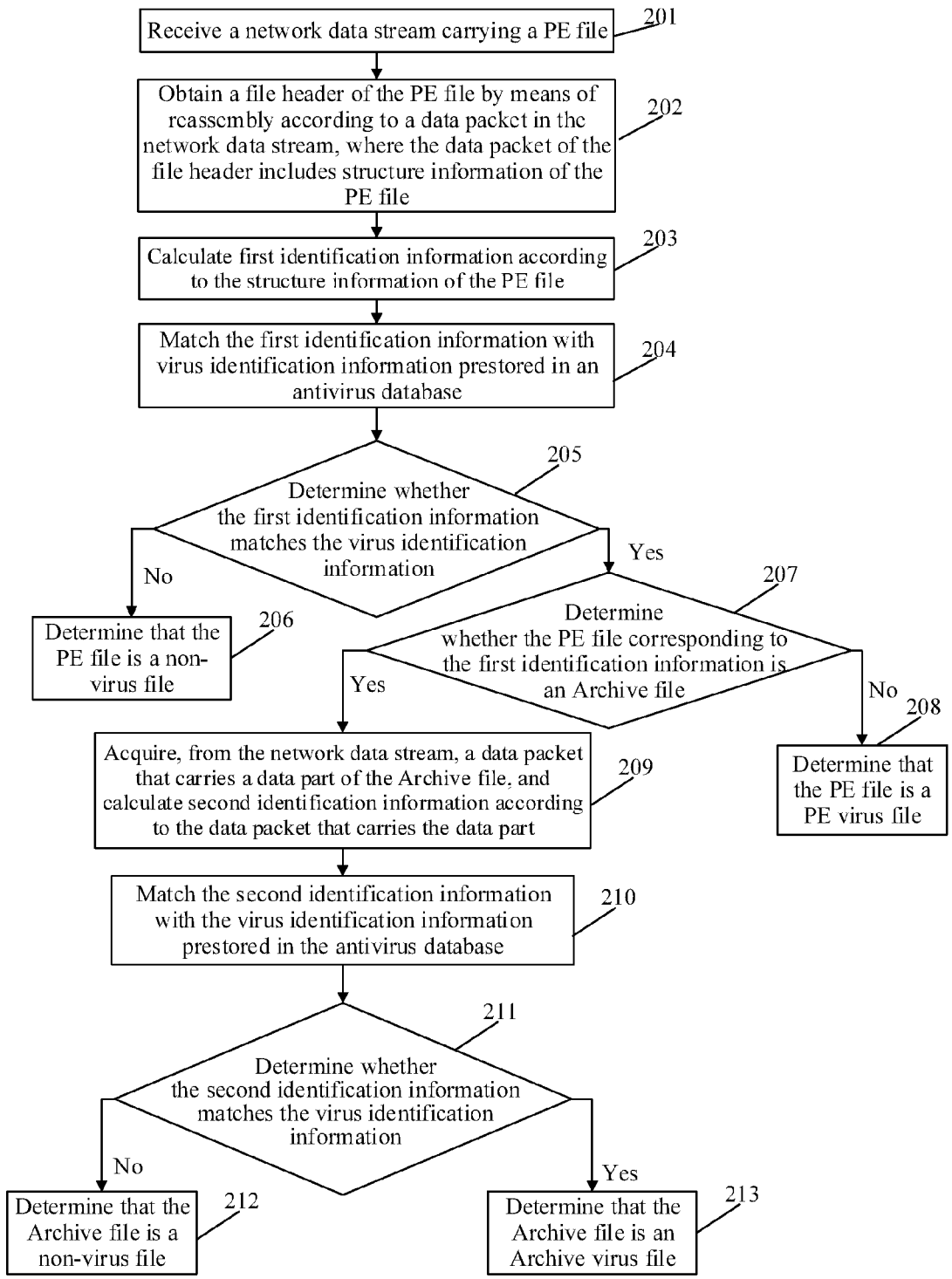
FIG. 3 is a flowchart of another virus detecting method according to an embodiment of the present invention.

Referring to FIG. 3, FIG. 3 is a flowchart of a virus detecting method according to an embodiment of the present invention, where the method includes the following steps.

201: Receive a network data stream carrying a PE file.

202: Obtain a file header of the PE file by means of reassembly according to a data packet in the network data stream, where the file header includes structure information of the PE file.

203: Calculate first identification information according to the structure information of the PE file.

For a specific manner of calculating the first identification information according to the structure information of the PE file, reference may be made to the embodiment in FIG. 1, and details are not repeatedly described herein.

204: Match the first identification information with virus identification information prestored in an antivirus database.

205: Determine whether the first identification information matches the virus identification information.

If the first identification information matches the virus identification information, step 207 is performed; if the first identification information does not match the virus identification information, step 206 is performed.

206: Determine that the PE file is a non-virus file. If the first identification information fails to match any piece of virus identification information in the antivirus database, it means that the PE file does not belong to a known virus, and it is determined that the PE file is a non-virus file.

207: Determine whether the PE file corresponding to the first identification information is an Archive file.

If the first identification information matches a piece of virus identification information in the antivirus database, the PE file is a virus file or an Archive file, and whether the PE file is a virus file or an Archive file may be further determined according to a correspondence that is between the virus identification information and a file type and is prestored in the antivirus database. If the PE file is an Archive file, step 209 is performed, or if the PE file is not an Archive file, step 208 is performed.

208: Determine that the PE file is a PE virus file. If the first identification information matches a piece of virus identification information in the antivirus database, and the PE file is not an Archive file, it is determined that the PE file is a virus file.

209: Acquire, from the network data stream, a data packet that carries a data part of the Archive file, and calculate second identification information according to the data packet that carries the data part.

For a process of calculating the second identification information, reference may be made to the embodiment in FIG. 1, and details are not repeatedly described herein.

210: Match the second identification information with the virus identification information prestored in the antivirus database.

211: Determine whether the second identification information matches the virus identification information. If the matching succeeds, step 213 is performed; and if the matching does not succeed, step 212 is performed.

212: Determine that the Archive file is a non-virus file. If the second identification information does not match any piece of virus identification information in the antivirus database, the Archive file does not belong to the known virus, and it is determined that the Archive file is a non-virus file.

213: Determine that the Archive file is an Archive virus file. If the second identification information matches a piece of virus identification information, it means that the Archive file is one of known viruses, and it is determined that the Archive file is an Archive virus file.

In the embodiment, when a virus file is determined, identification information that is used to identify a virus characteristic is extracted from a data packet of a PE file header, and in addition, identification information is further extracted from a data part of an Archive file, and whether the Archive file is a virus file is determined according to the two pieces of identification information. The present invention can effectively detect whether an Archive-type PE file is a virus file, improve reliability of a stream-based virus detecting method, and further improve security status of a network.

Figure 4:
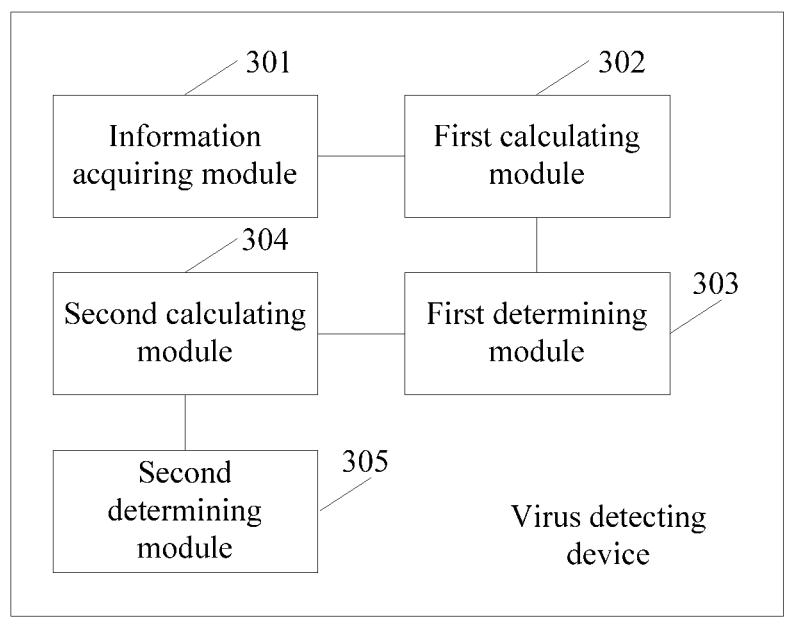
FIG. 4 is a structural diagram of a virus detecting device according to an embodiment of the present invention.

Referring to FIG. 4, FIG. 4 is a structural diagram of a virus detecting device according to an embodiment of the present invention, where the device includes an information acquiring module 301 configured to receive a network data stream carrying a portable execute PE file, and obtain a file header of the PE file by means of reassembly according to a data packet in the network data stream, where the file header includes structure information of the PE file; a first calculating module 302 configured to calculate first identification information according to the structure information that is of the PE file and that is acquired by the information acquiring module 301; a first determining module 303 configured to match the first identification information calculated by the first calculating module 302 with virus identification information prestored in an antivirus database, and if the matching succeeds, determine, according to a correspondence that is between the virus identification information and a file type and is prestored in the antivirus database, whether the PE file is an Archive file, where the file type includes an Archive file and a PE virus file, where the first determining module 303 is further configured to determine that the PE file is a PE virus file when determining that the PE file is a non-Archive file; a second calculating module 304 configured to, when the first determining module 303 determines that the PE file is an Archive file, acquire, from the network data stream, a data packet that carries a data part of the Archive file, and calculate second identification information according to the data packet that carries the data part of the Archive file; and a second determining module 305 configured to match the second identification information calculated by the second calculating module 304 with the virus identification information prestored in the antivirus database, and if the matching succeeds, determine that the Archive file is an Archive virus file.

Figure 5:
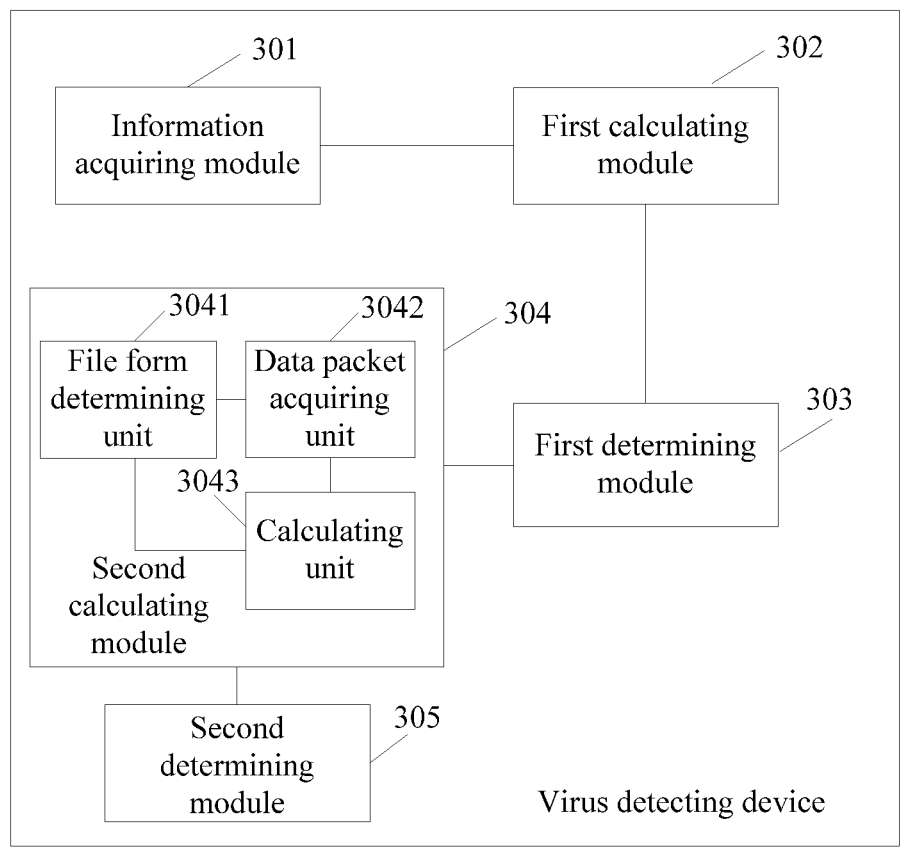
FIG. 5 is a structural diagram of another virus detecting device according to an embodiment of the present invention.

Optionally, the second calculating module 304 may further include a file form determining unit 3041, a data packet acquiring unit 3042, and a calculating unit 3043, and as shown in FIG. 5, where the file form determining unit 3041 is configured to search for, in a correspondence that is between the virus identification information and an Archive file form and is prestored in the antivirus database, an Archive file form corresponding to the first identification information, where the file form includes an Archive file whose data part includes data structure information and an Archive file whose data part does not include data structure information; the data packet acquiring unit 3042 is configured to acquire, from the network data stream, the data packet that carries the data part of the Archive file; and the calculating unit 3043 is configured to calculate the second identification information according to the Archive file form that is obtained by determining by the file form determining unit 3041 and that is corresponding to the first identification information and according to the data packet that carries the data part of the Archive file and that is acquired by the data packet acquiring unit 3042.

The calculating unit 3043 is configured to, when the Archive file form corresponding to the first identification information is the Archive file whose data part does not include data structure information, obtain the data part of the Archive file by means of reassembly according to the data packet that carries the data part of the Archive file, and calculate a hash value of the data part of the Archive file by using a hash algorithm, and use the hash value as the second identification information; or when the Archive file form corresponding to the first identification information is the Archive file whose data part includes data structure information, obtain, by means of reassembly according to the data packet that carries the Archive file part, the data structure information included in the data part of the Archive file, and calculate, by using a hash algorithm, a hash value of the data structure information obtained by means of reassembly, and use the hash value as the second identification information.

In the embodiment, the hash algorithm is preferably an MD5 algorithm.

Figure 6:
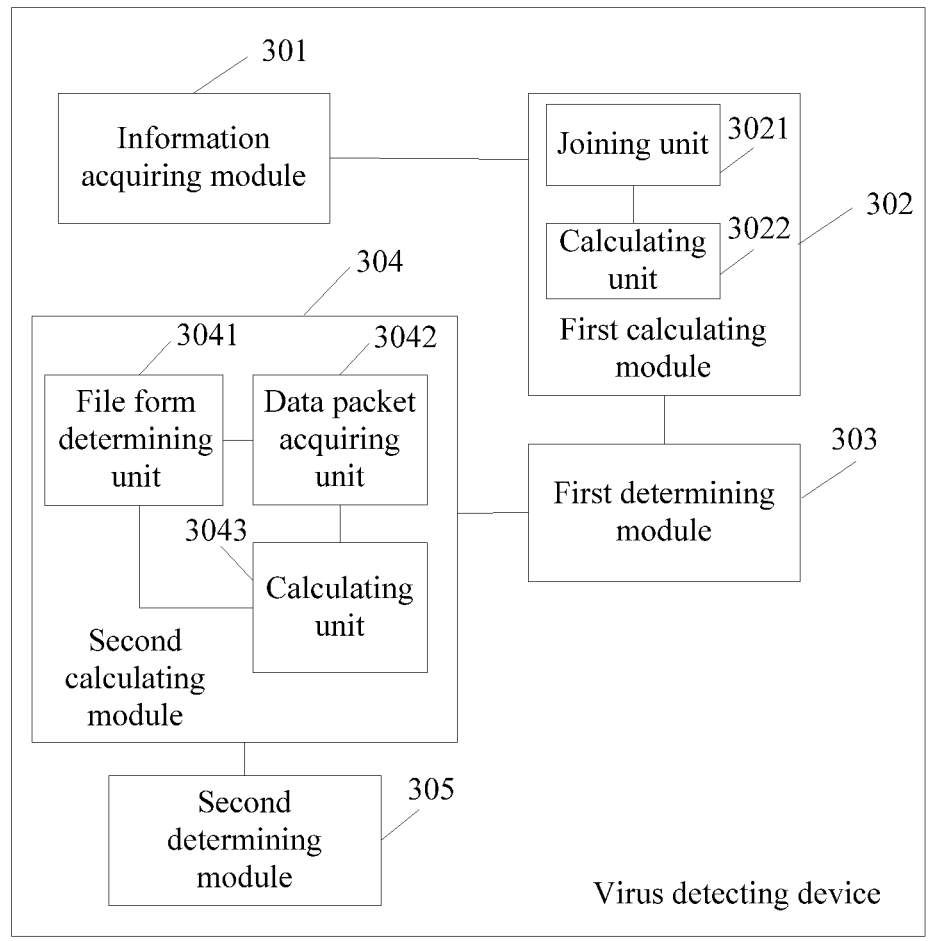
FIG. 6 is a structural diagram of still another virus detecting device according to an embodiment of the present invention.

The first calculating module 302 may further include a joining unit 3021 and a calculating unit 3022, and as shown in FIG. 6, where the joining unit 3021 is configured to select at least two pieces of attribute information from the structure information that is of the PE file and that is acquired by the information acquiring module 301, and join the attribute information into a data block; and the calculating unit 3022 is configured to calculate, by using the hash algorithm, a hash value of the data block that is joined by the joining unit 3021 and use the hash value as the first identification information.

In the embodiment, when a virus file is determined, identification information that is used to identify a virus characteristic is extracted from a data packet of a PE file header, and in addition, identification information is further extracted from a data part of an Archive file, and whether the Archive file is a virus file is determined according to the two pieces of identification information, thereby solving a problem in the prior art that whether an Archive file is a virus file carrying a virus cannot be determined. The embodiment can effectively detect whether the Archive file is a virus file, reduce a security risk caused because a virus spreader evades detection by making a virus file into an Archive file, improve reliability of a stream-based virus detecting method, and further improve security status of a network.

Figure 7:
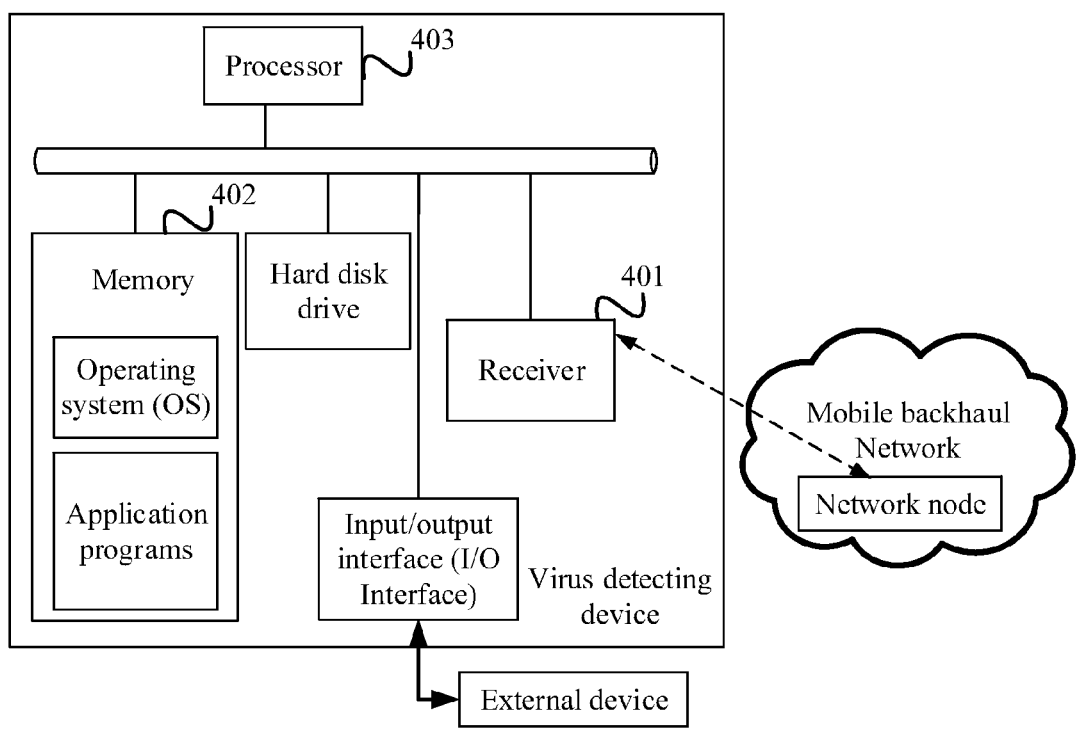
FIG. 7 is a structural schematic diagram of another virus detecting device according to an embodiment of the present invention.

Referring to FIG. 7, FIG. 7 is a structural diagram of a virus detecting device according to an embodiment of the present invention, where the virus detecting device includes a receiver 401, a memory 402, and a processor 403.

The receiver 401 is configured to receive a network data stream carrying a PE file.

The memory 402 is configured to store code.

The processor 403 is configured to read the code stored in the memory 402, and execute the following operations: obtaining a file header of the PE file by means of reassembly according to a data packet in the network data stream received by the receiver 401, where the data packet of the file header includes structure information of the PE file; calculating first identification information according to the structure information of the PE file; matching the first identification information with virus identification information prestored in an antivirus database, and when the matching succeeds, determining, according to a correspondence that is between the virus identification information and a file type and is prestored in the antivirus database, whether the PE file is an Archive file, where the file type includes an Archive file and a PE virus file; if the PE file is an Archive file, acquiring, from the network data stream, a data packet that carries a data part of the Archive file, and calculating second identification information according to the data packet that carries the data part of the Archive file; and matching the second identification information with the virus identification information prestored in the antivirus database, and when the matching succeeds, determining that the Archive file is an Archive virus file.

Optionally, a specific manner of executing, by the processor 403, the acquiring, from the network data stream, a data packet that carries a data part of the Archive file, and calculating second identification information according to the data packet that carries the data part of the Archive file is searching for, in a correspondence that is between the virus identification information and an Archive file form and is prestored in the antivirus database, an Archive file form corresponding to the first identification information, where the Archive file form includes an Archive file whose data part includes data structure information and an Archive file whose data part does not include data structure information; acquiring, from the network data stream, the data packet that carries the data part of the Archive file; and calculating the second identification information according to the Archive file form corresponding to the first identification information and according to the data packet that carries the data part of the Archive file.

A specific manner of executing, by the processor 403, the calculating the second identification information according to the Archive file form corresponding to the first identification information and according to the data packet that carries the data part of the Archive file may be, if the Archive file form corresponding to the first identification information is the Archive file whose data part does not include data structure information, obtaining the data part of the Archive file by means of reassembly according to the data packet that carries the data part of the Archive file, and calculating a hash value of the data part of the Archive file by using a hash algorithm, and use the hash value as the second identification information; or if the Archive file form corresponding to the first identification information is the Archive file whose data part includes data structure information, obtaining, by means of reassembly according to the data packet that carries the data part of the Archive file, the data structure information included in the data part of the Archive file, and calculating, by using a hash algorithm, a hash value of the data structure information obtained by means of reassembly, and use the hash value as the second identification information.

In the embodiment, the hash algorithm is preferably an MD5 algorithm.

A specific manner of executing, by the processor 403, the calculating first identification information according to the structure information of the PE file is selecting at least two pieces of attribute information from the structure information of the PE file, and joining the at least two pieces of attribute information into a data block; and calculating a hash value of the data block by using the hash algorithm, and use the hash value as the first identification information.

For a detailed working process of the virus detecting device, reference may be made to descriptions in the foregoing method embodiments, and details are not repeatedly described herein.

In the embodiment, when a virus detecting device determines a virus file, the virus detecting device extracts, from a data packet of a PE file header, identification information that is used to identify a virus characteristic, and in addition, the virus detecting device further extracts identification information from a data part of an Archive file, and determines whether the Archive file is a virus file according to the two pieces of identification information. The embodiment can effectively detect whether an Archive-type PE file is a virus file, improve reliability of a stream-based virus detecting method, and further improve security status of a network.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A virus detecting method, comprising:
receiving a network data stream carrying a portable execute (PE) file;
obtaining a file header of the PE file using a data packet in the network data stream, wherein the file header comprises structure information of the PE file;
calculating first identification information using the structure information of the PE file;
determining, according to a correspondence between virus identification information prestored in an antivirus database and a file type and prestored in the antivirus database, whether the PE file is an Archive file when successfully matching the first identification information with the virus identification information, wherein the file type comprises an Archive file and a PE virus file;
acquiring, from the network data stream, a data packet that carries a data part of the Archive file when the PE file is an Archive file;
calculating second identification information using the data packet that carries the data part of the Archive file; and
determining, that the Archive file is an Archive virus file when successfully matching the second identification information with the virus identification information prestored in the antivirus database.

2. The method according to claim 1, wherein the method further comprises determining that the PE file is a PE virus file when the PE file is a non-Archive file.

3. The method according to claim 1, wherein acquiring, from the network data stream, the data packet that carries the data part of the Archive file, and calculating the second identification information using the data packet that carries the data part of the Archive file comprises:
searching, in correspondence between the virus identification information and an Archive file form, for an Archive file form corresponding to the first identification information, wherein the Archive file form comprises an Archive file whose data part comprises data structure information and an Archive file whose data part does not comprise data structure information;
acquiring, from the network data stream, the data packet that carries the data part of the Archive file; and
calculating the second identification information using the Archive file form corresponding to the first identification information and the data packet that carries the data part of the Archive file.

4. The method according to claim 3, wherein calculating the second identification information using the Archive file form corresponding to the first identification information and the data packet that carries the data part of the Archive file comprises:
obtaining the data part of the Archive file using the data packet that carries the data part of the Archive file when the Archive file form corresponding to the first identification information is the Archive file whose data part does not comprise data structure information;
calculating a hash value of the data part of the Archive file using a hash algorithm when the Archive file form corresponding to the first identification information is the Archive file whose data part does not comprise data structure information;
using the hash value as the second identification information when the Archive file form corresponding to the first identification information is the Archive file whose data part does not comprise data structure information;
obtaining, using the data packet that carries the data part of the Archive file, the data structure information that is part of the data part of the Archive file when the Archive file fond corresponding to the first identification information is the Archive file whose data part comprises data structure information;
calculating, using a hash algorithm, a hash value of the data structure information when the Archive file form corresponding to the first identification information is the Archive file whose data part comprises data structure information; and
using the hash value as the second identification information when the Archive file form corresponding to the first identification information is the Archive file whose data part comprises data structure information.

5. The method according to claim 2, wherein acquiring, from the network data stream, the data packet that carries the data part of the Archive file, and calculating the second identification information using the data packet that carries the data part of the Archive file comprises:
searching, in correspondence between the virus identification information and an Archive file form and prestored in the antivirus database, for an Archive file form corresponding to the first identification information, wherein the Archive file form comprises an Archive file whose data part comprises data structure information and an Archive file whose data part does not comprise data structure information;
acquiring, from the network data stream, the data packet that carries the data part of the Archive file; and
calculating the second identification information using the Archive file form corresponding to the first identification information and the data packet that carries the data part of the Archive file.

6. The method according to claim 5, wherein calculating the second identification information using the Archive file form corresponding to the first identification information and the data packet that carries the data part of the Archive file comprises:
obtaining the data part of the Archive file by means of reassembly according to the data packet that carries the data part of the Archive file when the Archive file form corresponding to the first identification information is the Archive file whose data part does not comprise data structure information;
calculating a hash value of the data part of the Archive file using a hash algorithm when the Archive file form corresponding to the first identification information is the Archive file whose data part does not comprise data structure information;
using the hash value as the second identification information when the Archive file form corresponding to the first identification information is the Archive file whose data part does not comprise data structure information;
obtaining, by means of reassembly according to the data packet that carries the data part of the Archive file, the data structure information comprised in the data part of the Archive file when the Archive file form corresponding to the first identification information is the Archive file whose data part comprises data structure information;

calculating, using a hash algorithm, a hash value of the data structure information when the Archive file form corresponding to the first identification information is the Archive file whose data part comprises data structure information; and using the hash value as the second identification information when the Archive file form corresponding to the first identification information is the Archive file whose data part comprises data structure information.

7. The method according to claim 1, wherein calculating the first identification information according to the structure information of the PE file comprises:

selecting at least two pieces of attribute information from the structure information of the PE file;

joining the at least two pieces of attribute information into a data block;

calculating a hash value of the data block using a hash algorithm; and using the hash value as the first identification information.

8. A virus detecting device, comprising:

a memory storing executable instructions, and a processor coupled to the memory, wherein the instructions cause the processor to be configured to:

receive a network data stream carrying a portable execute (PE) file;

obtain a file header of the PE file using a data packet in the network data stream, wherein the file header comprises structure information of the PE file;

calculate first identification information according to the structure information of the PE;

determine, according to a correspondence between virus identification information prestored in an antivirus database and a file type and prestored in the antivirus database, whether the PE file is an Archive file when successfully matching the first identification information with the virus identification information, wherein the file type comprises an Archive file and a PE virus file;

acquire, from the network data stream, a data packet that carries a data part of the Archive file when the PE file is an Archive file;

calculate second identification information using the data packet that carries the data part of the Archive file; and determine that the Archive file is an Archive virus file when successfully matching the second identification information with the virus identification information prestored in the antivirus database.

9. The device according to claim 8, wherein the processor is further configured to determine that the PE file is a PE virus file when the PE file is a non-Archive file.

10. The device according to claim 8, wherein the instructions further cause the processor to be configured to:

search, in correspondence between the virus identification information and an Archive file form, for an Archive file form corresponding to the first identification information, wherein the Archive file form comprises an Archive file whose data part comprises data structure information and an Archive file whose data part does not comprise data structure information;

acquire, from the network data stream, the data packet that carries the data part of the Archive file; and calculate the second identification information using the Archive file form corresponding to the first identification information and the data packet that carries the data part of the Archive file.

11. The device according to claim 10, wherein the instructions further cause the processor to be configured to:

obtain the data part of the Archive file by means of reassembly according to the data packet that carries the data part of the Archive file when the Archive file form corresponding to the first identification information is the Archive file whose data part does not comprise data structure information;

calculate a hash value of the data part of the Archive file using a hash algorithm when the Archive file form corresponding to the first identification information is the Archive file whose data part does not comprise data structure information;

use the hash value as the second identification information when the Archive file form corresponding to the first identification information is the Archive file whose data part does not comprise data structure information;

obtain the data structure information comprised in the data part of the Archive file by means of reassembly according to the data packet that carries the data part of the Archive file when the Archive file form corresponding to the first identification information is the Archive file whose data part comprises data structure information;

calculate, using a hash algorithm, a hash value of the data structure information obtained by means of reassembly when the Archive file form corresponding to the first identification information is the Archive file whose data part comprises data structure information;

use the hash value as the second identification information when the Archive file form corresponding to the first identification information is the Archive file whose data part comprises data structure information.

12. The device according to claim 9, wherein the instructions further cause the processor to be configured to:

search, in a correspondence between the virus identification information and an Archive file form and prestored in the antivirus database, for an Archive file form corresponding to the first identification information, wherein the Archive file form comprises an Archive file whose data part comprises data structure information and an Archive file whose data part does not comprise data structure information;

acquire, from the network data stream, the data packet that carries the data part of the Archive file; and calculate the second identification information using the Archive file form corresponding to the first identification information and the data packet that carries the data part of the Archive file.

13. The device according to claim 12, wherein the instructions further cause the processor to be configured to:

obtain the data part of the Archive file by means of reassembly according to the data packet that carries the data part of the Archive file when the Archive file form corresponding to the first identification information is the Archive file whose data part does not comprise data structure information;

calculate a hash value of the data part of the Archive file using a hash algorithm when the Archive file form corresponding to the first identification information is the Archive file whose data part does not comprise data structure information;

use the hash value as the second identification information when the Archive file form corresponding to the first identification information is the Archive file whose data part does not comprise data structure information;
obtain the data structure information comprised in the data part of the Archive file by means of reassembly according to the data packet that carries the data part of the Archive file when the Archive file form corresponding to the first identification information is the Archive file whose data part comprises data structure information;
calculate, using a hash algorithm, a hash value of the data structure information obtained by means of reassembly when the Archive file form corresponding to the first identification information is the Archive file whose data part comprises data structure information; and
use the hash value as the second identification information when the Archive file form corresponding to the first identification information is the Archive file whose data part comprises data structure information.

14. The device according to claim 8, wherein the instructions further cause the processor to be configured to:
select at least two pieces of attribute information from the structure information of the PE file;
join the at least two pieces of attribute information into a data block; and
calculate, using a hash algorithm, a hash value of the data block; and
use the hash value as the first identification information.

15. A virus detecting device, comprising:
a receiver,
a memory; and
a processor coupled to the receiver and the memory,
wherein the receiver is configured to receive a network data stream carrying a portable execute (PE) file,
wherein the memory is configured to store code, and
wherein the processor is configured to read the code stored in the memory and execute the following operations:
obtaining a file header of the PE file using a data packet in the network data stream received by the receiver, wherein the file header comprises structure information of the PE file;
calculating first identification information according to the structure information of the PE file;
matching the first identification information with virus identification information prestored in an antivirus database, and when the matching succeeds, determining, according to a correspondence between the virus identification information and a file type and prestored in the antivirus database, whether the PE file is an Archive file, wherein the file type comprises an Archive file and a PE virus file;
acquiring, from the network data stream, a data packet that carries a data part of the Archive file when the PE file is an Archive file;
calculating second identification information using the data packet that carries the data part of the Archive file; and
determining that the Archive file is an Archive virus file when successfully matching the second identification information with the virus identification information prestored in the antivirus database, determining.

16. The device according to claim 15, wherein the processor being configured to acquire, from the network data stream, the data packet that carries the data part of the Archive file, and calculate the second identification information according to the data packet that carries the data part of the Archive file comprises:
searching, in correspondence between the virus identification information and an Archive file form, for an Archive file form corresponding to the first identification information, wherein the Archive file form comprises an Archive file whose data part comprises data structure information and an Archive file whose data part does not comprise data structure information;
acquiring, from the network data stream, the data packet that carries the data part of the Archive file; and
calculating the second identification information using the Archive file form corresponding to the first identification information and the data packet that carries the data part of the Archive file.

17. The device according to claim 16, wherein the processor being configured to calculate the second identification information using the Archive file form corresponding to the first identification information and the data packet that carries the data part of the Archive file comprises:
obtaining the data part of the Archive file by means of reassembly according to the data packet that carries the data part of the Archive file when the Archive file form corresponding to the first identification information is the Archive file whose data part does not comprise data structure information;
calculating a hash value of the data part of the Archive file using a hash algorithm when the Archive file form corresponding to the first identification information is the Archive file whose data part does not comprise data structure information;
using the hash value as the second identification information when the Archive file form corresponding to the first identification information is the Archive file whose data part does not comprise data structure information;
obtaining, by means of reassembly according to the data packet that carries the data part of the Archive file, the data structure information comprised in the data part of the Archive file when the Archive file form corresponding to the first identification information is the Archive file whose data part comprises data structure information;
calculating, using a hash algorithm, a hash value of the data structure information obtained by means of reassembly when the Archive file form corresponding to the first identification information is the Archive file whose data part comprises data structure information; and
using the hash value as the second identification information when the Archive file form corresponding to the first identification information is the Archive file whose data part comprises data structure information.

18. The device according to claim 15, wherein the processor being configured to calculate the first identification information according to the structure information of the PE file comprises:
selecting at least two pieces of attribute information from the structure information of the PE file;
joining the at least two pieces of attribute information into a data block;
calculating a hash value of the data block using a hash algorithm; and
using the hash value as the first identification information.

19. The device according to claim 15, wherein the processor is further configured to determine that the PE file is a PE virus file when the PE file is a non-Archive file.

* * * * *